United States Patent [19]

Christie

[11] 4,015,634
[45] Apr. 5, 1977

[54] SPLIT-SLEEVE PIPE DEVICE WITH INTEGRAL SEAL AND INSULATOR

[76] Inventor: Joe William Christie, P.O. Box 386, Frisco, Tex. 75034

[22] Filed: May 2, 1975

[21] Appl. No.: 574,245

[52] U.S. Cl. .............................. 138/99; 285/197; 285/373
[51] Int. Cl.² ....................................... F16L 41/06
[58] Field of Search ............. 138/97, 99, 103, 106, 138/110, 148; 285/53, 197, 373

[56] References Cited

UNITED STATES PATENTS

| | | | |
|---|---|---|---|
| 631,867 | 8/1899 | Beaver | 285/373 |
| 1,789,387 | 1/1931 | McCree | 138/103 |
| 2,094,258 | 9/1937 | Thompson | 138/99 |
| 2,146,067 | 2/1939 | Graham | 285/373 |
| 2,690,193 | 9/1954 | Smith | 138/99 |
| 2,775,469 | 12/1956 | Brown et al. | 285/373 X |
| 2,899,984 | 8/1959 | Gaffin | 285/373 X |
| 3,563,276 | 2/1971 | Hight et al. | 138/99 |
| 3,685,545 | 8/1972 | Smith et al. | 285/373 X |
| 3,861,422 | 1/1975 | Christie | 138/99 |

FOREIGN PATENTS OR APPLICATIONS

| | | | |
|---|---|---|---|
| 790,109 | 2/1958 | United Kingdom | 285/373 |

Primary Examiner—Richard E. Aegerter
Assistant Examiner—James E. Bryant, III
Attorney, Agent, or Firm—Richards, Harris & Medlock

[57] ABSTRACT

A split-sleeve type pipe device for assembly on a pipe for sealing off at a leak, hot tapping a pipe at a desired location, and electrically insulating the pipe for cathodic protection. The coupling includes a one piece gasket insulator having split annular end seal portions connected by longitudinal side runner seal portions, and a pair of housing halves which fit together over the gasket to form a sealed housing along the pipe. Annular portions extend axially from either side of each annular seal portion for insulating the pipe from the housing. One of the housing halves has an externally threaded side boss defining an opening into the housing through one of the shell halves for manipulation of pipe cutting equipment and for connection of a valve or other suitable equipment. Both housing halves have internal and external flanges for engaging annular electrical insulator portions. End set screws and compression rings are provided for gasket compression.

7 Claims, 3 Drawing Figures

SPLIT-SLEEVE PIPE DEVICE WITH INTEGRAL SEAL AND INSULATOR

BACKGROUND OF THE INVENTION

The present invention relates to split-sleeve pipe fittings which may be used to electrically insulate pipe sections for cathodic protection. More particularly, this invention relates to improvements in the seal configuration of a split-sleeve type device.

The need for a split-sleeve type pipe coupling such as that disclosed in U.S. Pat. No. 3,861,422, is encountered under several different circumstances. One of these circumstances occurs when it is desirable to cut and electrically insulate sections of pipeline for the purposes of providing cathodic protection which requires that the sections of the pipeline be electrically isolated from each other. In these devices, it is important not only to provide an efficient seal, but also to insulate the pipe sections from each other and from the split-sleeve device itself. In the prior art devices, separate insulator and seal members have been utilized to provide this function and these configurations have not been entirely satisfactory under all conditions of service, because in some instances, they are difficult to position and install because of the necessity of aligning separate seal and insulator portions.

SUMMARY OF THE INVENTION

The device of the present invention provides a split-sleeve type device for providing a gas-tight connection between two pipe sections by use of an improved unitary seal.

The device includes a pair of semi-cylindrical half sleeve housing sections. One section has means for introducing a pipe cutter and mounting a valve to connect a lateral line to the housing. The fitting includes an improved one-piece gasket having split annular end portions and longitudinal side runner portions for sealing between the half sections and around the pipe. Each annular end portion has a conical sealface with axially extending annular flange portion on either side thereof.

End flanges are provided on the housing sections with longitudinal extending set screws for cooperation with a ring to compress gaskets within the sections.

At the desired location on the pipes to which the device is to be connected, the integral gasket is opened and positioned around the pipe. The split compression rings are placed around the pipe in contact with the annular end portions of the seal. The housing halves are bolted together around the seal. The set screws are tightened to move the compression rings to uniformly expand the annular end portions to seal between housing halves and around the pipe. After the device is assembled on the pipe, a gate valve and drilling machine may be installed through the side opening, and the pipe then severed. The side opening may be closed with a suitable cap.

BRIEF DESCRIPTION OF THE DRAWINGS

A more complete understanding of the present invention may be had by referring to the following Detailed Description when taken in conjunction with the accompanying drawings wherein.

DESCRIPTION OF THE PREFERRED EMBODIMENT

Figure 3:
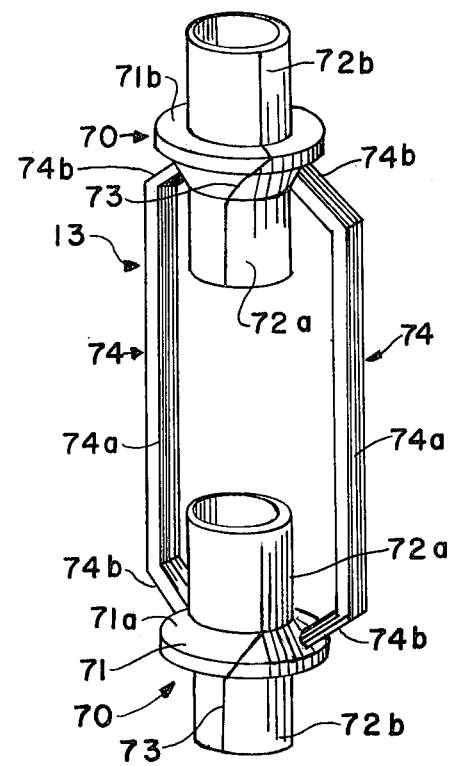
FIG. 3 is a perspective view of the improved gasket of the present invention.

Referring now to the drawings, wherein like reference characters designate like or corresponding parts throughout the several views there is shown a split-sleeve type device 10 embodying the features of the present invention. The device has an upper semi-cylindrical housing half-section 11, a lower semi-cylindrical half-section 12, and an improved one-piece gasket 13. The gasket 13 splits and fits directly on the pipe in the area where the pipe is to be severed. The gasket is then tightly confined around the pipe by the housing halves.

The uper housing half 11 has a semi-circular body portion 21 with integral sidewardly-extending longitudinal flange portions 22 having spaced protuberances provided with vertical bolt holes 23, 24 and 25. The body portion 21 also has inwardly extending internal end flanges 30 which have circumferencially spaced threaded holes 31 for axially extending set screws 32 which perform a gasket compression function to be described hereinafter.

The upper housing half 11 has an upwardly-extending externally threaded tubular portion or boss 33 defining an opening to which may be secured a valve or a closure cap, and through which pipe cutting or other operating functions may be performed. As illustrated, a threaded fitting 34 is secured in a boss 33 defining an opening for the admission of certain tools, such as cutting devices. The opening into the housing member 11 through the boss 33 is closed by an internally threaded cap 35.

The interior of the housing half 11 is provided with a series of internal flanges and seat surfaces which are not shown in the drawings, but which are identical to and correspond with the same features illustrated, and which will be described in connection with the lower housing half 12.

Figure 1:
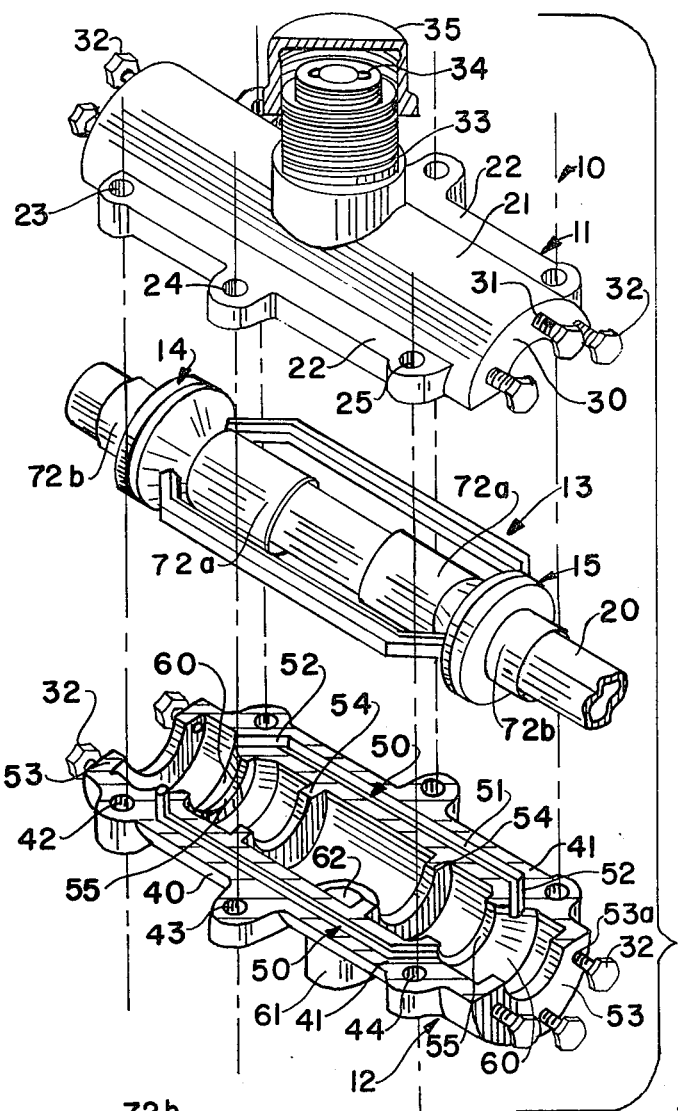
FIG. 1 is an exploded perspective view of a split-sleeve pipe device embodying the improved seal of the present invention and showing the two housing halves on opposite sides of the improved gasket.
Figure 2:
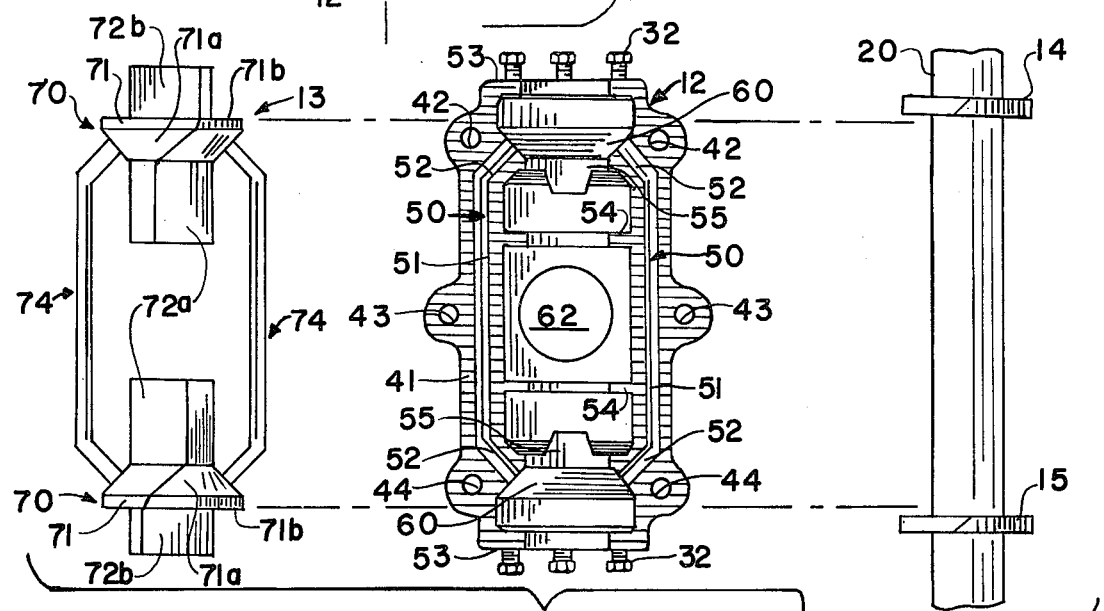
FIG. 2 is an exploded top plan view of the various components of the device illustrating the compression rings on the pipe sections prior to assembly of the housing halves and the improved gasket on the pipes.

The lower housing half 12, as illustrated in FIGS. 1 and 2, includes a cylindrical body portion 40 provided with longitudinal outwardly extending side flanges 41, which have longitudinally spaced protrudences having vertical bolt holes 42, 43, and 44. The holes will receive bolts for connecting the lower housing half to the upper half around the pipe and gasket.

The upper face of the housing half 12 has longitudinally extending gasket grooves 50, each formed by an elongated straight portion 51 and an inwardly angulated end portion 52. The gasket grooves each received a runner portion of the gasket 13 to be hereinafter described. The gasket grooves 50 are axially formed in and extend along edge portions of the body 40 and the side flanges 41. It will be understood that the upper housing half 11 had identical corresponding gasket grooves which are not shown, but which register with the gasket grooves 50 in the lower half when the two halves are fitted together to accommodate the side runners of the gasket 13. The housing half 12 has inwardly-extending semi-circular end flanges 53, which correspond with end flanges 30 on the upper housing half 11 so that when the two halves are secured together, the corresponding flanges 30 and 53 combine to form a flanged circular closure at each end of the pipe device around the pipe 20. The end flanges 53 of the lower half 12 have internally threaded holes 53a for axially aligning set screws 32 in a same manner as the screws 32 in the upper half section.

The interior of the lower housing half 12 has a pair of spaced internal central half circular flanges 54 provided on opposite sides of the geometrical center of the housing half. The interior of the housing half 12 is also provided with spaced internal flanges 55 which are positioned outwardly of and on opposite sides of the central flanges 54. Each of the flanges 55 has an outwardly facing conical gasket seat surface 60. The lower housing half has a centrally located bottom hollow cylindrical portion 61 providing a cylindrical chamber 62 opening into the housing half between the flanges 54. The chamber 62 provides space for portions of a valve on valve stem and may serve a function in connection with the cutting of the pipe within the housing.

In FIG. 3 a particular feature of the invention is illustrated. A gasket 13 is shown having a pair of identical split annular end members 70 which include a conical flange portion 71 and inwardly and outwardly directed axial cylindrical flange portions 72a and 72b, respectively. The integral end members 70 are cut along an angle designated by the lines 73 permitting each of the end members to be spread apart to fit around the pipe 20 when assembling the gasket on the pipe. The conical face 71a of the flange 71 of the gasket end member is formed at an angle to conform with the angle of the conical face 60 in the housing halves 11 and 12. The axial length of the end members are guaged to precisely fit the dimensions of the housing halves 11 and 12. The gasket 13 also includes a pair of identical integral side runners 74 formed on parallel longitudinal elongated portions 74a and inwardly angled end portions 74b which are dimensioned and positioned at proper angles to register with gasket grooves 51 and 52 in the two housing halves 11 and 12 so that the gasket runners fit snugly in the groove for sealing between the housing halves. The gasket is a single piece flexible member of a material such as neoprene, which is readily opened to fit around the pipe in assembling the pipe device on the pipe 20.

Prior to installing device 10 on the pipe 20, all dirt, rust, and pipe cutting is cleaned from the pipe along the length over which the device is to be installed. Two compression rings 14 and 15 are opened and placed around the pipe 20 in the relative longitudinal positions shown on the right-hand drawing of FIG. 2. The spacing of the compression rings 14 and 15 on a pipe is determined by the length of the gasket 13. These rings 14 and 15 can be constructed from a suitable material such as polyethylene or the like.

After the rings 14 and 15 are placed around the pipe at the approximate locations described, the end members 70 of the gasket 13 are spread apart and the gasket is placed around the pipe with each of the end members being disposed between the rings 14 and 15 in the relationship illustrated in the central drawing of FIG. 1. When so positioned, the interior directed cylindrical flange portions 72a each extend a sufficient distance to contact the half circular flanges 54. The exteriorally directed cylindrical flange portions 72b each extend a sufficient distance to engage the end flanges 53. In this manner the pipe sections are insulated from the fitting and from each other. The rings 14 and 15 are of a size to fit over the exteriorally directed axial cylindrical flange portions 72b. And as can be seen in the central drawing of FIG. 1, rings 14 and 15 will contact the outside end faces 71b of the end members 70.

The bottom housing half 12 is then positioned under the pipe with the gasket aligned within the housing halves. The conical body portion 71 of the gasket end member 70 and adjacent rings 14 and 15 fit within the end chambers of the housing halves between flanges 53 and 55 at each end of the housing as illustrated in FIG. 1. The lower housing half 12 is held in position around the bottom half of the gasket 13 with the side runners 74 of the gasket fitted along the groove 50 along each side of the housing half. The top housing half 11 is similarly aligned and placed over the upper halves of the rings and gaskets so that bolt holes 23, 24, and 25 of the upper housing half are aligned with bolt holes 42, 43 and 44, respectively, of the lower housing half 12. Two bolts, not shown, are inserted through the aligned central holes 24 and 43 of the upper and lower housing halves and nuts are placed on the bolts and turned hand-tight. The end set screws 32 at the ends of both of the upper and lower halves 11 and 12 are tightened gradually and uniformly against rings 14 and 15 at each end of the device. The set screws are turned until they are snug against the outer faces of the rings. The remaining side bolts not shown are placed through the aligned holes 23 and 42 and 25 and 44 of the split-sleeve housing halves. The bolts are gradually and uniformly tightened along the opposite sides of the split-sleeve housing using a 12 inches tork wrench until an estimated pull of approximately 60 lbs. is reached. The set screws 32 are tightened with a 6 inches wrench against the rings 14 and 15 until an estimated pull of 40 lbs. is reached.

With the split-sleeve device installed on the pipe 20 as described, completion of the sealing around the pipe is accomplished by screwing the cap 25 on the threaded side fitting 33.

The upper and lower housing halves are supported on and spaced from the pipe by the gasket 13 to electrically insulate the housing halves from the pipe. The forcing of the ring portions 14 and 15 against the end members 70 squeezes and expands the annular gasket end portions around the pipe between the split-sleeve flanges 54 and 55 at each end of the split-sleeve device, thereby sealing off against leakage around the pipe within the housing. The action of the follower rings in forcing the gasket conical portions inwardly against the split-sleeve conical faces 60 effects a tightened sealed relationship between the pipe and the inside surface of the portions 72 of the end members of the gasket and between the outer faces of the gasket, particularly along the conical faces 60 of the housing halves. If the pipe is to be cut for cathodic protection purposes or for the connection of a lateral line, a suitable standard gate valve and drilling machine are installed on the threaded boss 33 on the top housing half 11. A suitable shell cutter, not shown, is used to completely cut the pipe 20 within the split-sleeve device between the flanges 54 of the split-sleeve sections. After the pipe 20 has been cut, the drilling equipment is removed and completion equipment is inserted and a connection plug set. The completion equipment and gate valve are then removed and the pipe cap 35 is then screwed onto the boss 33.

It is preferred that the tension on all of the side bolts and the end set screws be checked by making sure that they are tightened at the stated tork. With the pipes so fitting on the severed portions of the pipe 20 cut within the split-sleeve device, a complete pressure seal is formed around the pipe by the device, and the severed pipe sections are electrically insulated from each other. The use of an integral electrical insulator and gasket structure comprises improvements over the previous multiple piece arrangements.

A preferred embodiment of the present invention has been described, but it is to be understood, of course, that numerous modifications and alterations in the invention could by made by those of ordinary skill in the art without departing from the invention as defined in the appended claims.

What is claimed is:

1. A split-sleeve pipe device comprising in combination:

a cylindrical elongated housing enclosure including an upper housing-half section and a lower housing-half section connectable together around a pipe; each of said housing-half sections having first longitudinally spaced central internal semi-circular flanges disposed in planes perpendicular to the longitudinal axis of said housing-half sections, each of said housing-half sections having a second pair of internal semi-circular flanges spaced apart longitudinally on opposite sides and outwardly of said first pair of internal flanges and disposed in planes perpendicular to the longitudinal axis of said housing sections, said second flanges each having an outwardly facing conical seal surface; said housing-half sections having inwardly extending end flanges disposed in planes perpendicular to the longitudinal axis of said housing sections; said housing-half sections each having a longitudinal gasket groove along each side edge of each of said half sections for accommodating an elongated gasket portion along each side of said housing enclosure from said conical gasket seat surface at one end of said enclosure to said conical gasket seat surface at the other end of said enclosure; each of said housing-half sections having longitudinal side flanges provided with bolt holes for coupling said housing-half sections together around a pipe; a first of said housing-half sections having boss means defining a lateral opening to said housing enclosure and a second of said housing-half sections having an enlargement defining a chamber opening into said housing enclosure aligned with said opening of said first housing-half section; each of said housing-half sections having set screws axially aligned and circumferentially spaced through said end flange at each end of each of said half sections for expanding gasket means within said housing enclosure at each end thereof around said pipe passing therethrough; a pair of compression rings adapted to fit around said pipe and having annular outwardly extending flanges perpendicular to the axis of said ring; each of said rings being split whereby said rings may be spread apart and fitted around said pipe during assembly of said device on said pipe; and a one-piece gasket adapted to fit around said pipe within said housing enclosure between said housing-half sections to provide a fluid type seal between said housing-half sections and said pipe along a longitudinal portion of said pipe and to electrically insulate said pipe from said housing sections; said gasket having split annular end members each adapted to fit within said housing-half sections between one of said second internal flanges and the adjacent end flange of said housing-half section, each of said end members having a conical seal surface engageable with said conical seat surface on said second flange of said housing-half sections to provide an annular seal around said pipe within said housing enclosure at each end of said enclosure, annular flange portions extending inwardly and outwardly from each of said seal surfaces for surrounding and insulating said pipe and contacting respectively, said first central internal flanges and said end flanges, and said gasket having longitudinal side runner portions extending along each side of said gasket between said end members for engagement with said gasket grooves along each of said side portions of each of said housing-half sections to provide a fluid type longitudinal seal along each side of said housing enclosure between the enjoining side edges of said housing-half sections between said annular end members of said gasket.

2. In combination with a split-sleeve device of the type including a first housing-half member; a second housing-half member connected to said first housing-half member for forming a complete housing enclosure around longitudinally spaced ends of two axially aligned sections of pipe; and integral one-piece pressure sealing gasket means positioned around said pipe sections within said housing-half members for sealing against fluid pressure loss from said housing enclosure and for insulating said pipe sections from said housing-half members; the gasket means including an annular end portion around each section of pipe adjacent the end thereof, each end portion having an inwardly facing conical seal surface for engagement with a corresponding conical seat surface in each of said housing-half members and longitudinal runners extending from opposite sides of the annular end portions and connecting said end portions for sealing between said housing-half members along longitudinal lines whereby the ends of said pipe sections are sealed against fluid loss within said housing enclosure between said end portions of said gasket means, the improvement which comprises:

annular flange portions extending axially inwardly and outwardly from each of said seal surfaces for surrounding and insulating said sections of pipe from said housing-halves and from each other.

3. A split-sleeve pipe device as defined in claim 2 including:

compression rings adapted to be disposed in a longitudinally spaced relationship around said pipe sections for engagement for said annular end portions of said gasket means to expand the latter for effecting a fluid-tight seal around said pipe within said housing enclosure between said housing-half members and said pipe.

4. A split-sleeve pipe device as defined in claim 2 wherein:

each of said housing-half members is provided with a first pair of internal longitudinally spaced half-circular flanges cooperating with and engaging the inwardly directed annular flange portion on said end members to hold said pipe sections in position in said device without effecting electrical contact between said pipe sections and said housing-half members;

said housing-half members having a second pair of internal longitudinally spaced half-circular flanges cooperating with and engaging said annular end portions of said gasket means to provide a fluid seal along opposite end portions of said pipe device between said pipe and said housing-half members.

5. A split-sleeve pipe device as defined in claim 2 wherein each of said housing-half members is provided with a pair of inwardly extending end flanges disposed in a plane perpendicular to the longitudinal axis of said housing sections cooperating with and engaging the outwardly extending annular flange portions to insulate said pipe sections from each other and said housing-half sections.

6. A split-sleeve pipe device as defined in claim 3 including:

means for adjusting said gasket means independently of the relative position of said housing-halves;

the adjusting means having a plurality of circumferentially spaced axially aligned set screws in opposite ends of each of said housing-half members for engaging each of said compression rings inwardly to apply a longitudinal compression force on said annular end portions of said gasket means.

7. A split-sleeve pipe device as defined in claim 6 wherein:

said first housing-half member is provided with an external cylindrical boss defining a lateral opening into said housing and enclosure for connection of auxillary apparatus to said device;

said second housing-half member having an external lateral enlargement defining a chamber opening into said housing enclosure opposite the boss of said enclosure and aligned with the lateral opening thereof.

* * * * *

UNITED STATES PATENT OFFICE
CERTIFICATE OF CORRECTION

Patent No. 4015634            Dated April 5, 1977

Inventor(s) Joe William Christie

It is certified that error appears in the above-identified patent and that said Letters Patent are hereby corrected as shown below:

Column 2, line 22, "uper" should be --upper--.

Column 4, line 32, "12 inches tork" should be --12" tork--;
         line 34, "6 inches wrench" should be --6" wrench--.

Signed and Sealed this twelfth Day of July 1977

[SEAL]

Attest:

RUTH C. MASON
*Attesting Officer*

C. MARSHALL DANN
*Commissioner of Patents and Trademarks*